United States Patent [19]

Schmatz et al.

[11] 4,240,574

[45] Dec. 23, 1980

[54] FLUXLESS BRAZING OF ALUMINUM IN INERT GAS

[75] Inventors: Duane J. Schmatz, Dearborn Heights; Walter L. Winterbottom, Farmington Hills, both of Mich.

[73] Assignee: Ford Motor Company, Dearborn, Mich.

[21] Appl. No.: 885,911

[22] Filed: Mar. 13, 1978

[51] Int. Cl.³ .............................................. B23K 1/19
[52] U.S. Cl. .................................. 228/217; 228/219; 228/239; 228/263 F
[58] Field of Search ............... 228/217, 219, 221, 239, 228/263 F; 428/654

[56] References Cited

U.S. PATENT DOCUMENTS

| | | | |
|---|---|---|---|
| 3,321,828 | 5/1967 | Miller | 228/217 X |
| 3,322,517 | 5/1967 | Miller | 428/654 |
| 3,373,482 | 3/1968 | Miller | 228/221 |
| 3,373,483 | 3/1968 | Miller | 228/221 |
| 3,378,914 | 4/1968 | Miller | 228/219 X |
| 3,673,678 | 7/1972 | Moreau et al. | 228/219 |
| 3,788,824 | 1/1974 | Singleton et al. | 228/263 F X |
| 3,811,177 | 5/1974 | Schoer et al. | 228/219 |
| 3,853,547 | 12/1974 | Singleton, Jr. | 228/263 F X |
| 3,891,400 | 6/1975 | Robinson | 428/654 |
| 3,898,053 | 8/1975 | Singleton, Jr. | 428/654 |
| 4,093,782 | 6/1978 | Anthony et al. | 428/654 |
| 4,121,750 | 10/1978 | Schoer et al. | 228/219 |
| 4,143,802 | 3/1979 | Winterbottom | 228/217 |
| 4,146,163 | 3/1979 | Anderson et al. | 228/263 F X |

*Primary Examiner*—Kenneth J. Ramsey
*Attorney, Agent, or Firm*—Joseph W. Malleck; Olin B. Johnson

[57] ABSTRACT

A method of brazing aluminum parts in an inert gas atmosphere is disclosed. The brazed filler metal is controlled to contain a ternary alloy of aluminum-silicon-magnesium and the base aluminum parts are controlled to contain a binary alloy of aluminum-magnesium. Magnesium in the base metal is controlled to 0.4–1.2% and in the filler metal it is controlled to 0.2–0.6%; in the filler metal only, silicon is controlled to 7–12%. The assembled base metal parts and filler metal are subjected to differential heating rates, one rate being limited to at least 50° C./minute when the metal parts reach temperatures in the range of 400°–550° C., and a conventional rate when outside said temperature zone. As a result, three physical parameters are caused to occur simultaneously: initiation of porosity in oxide film on the metal parts, transport of magnesium to the oxide interface and reaction with the oxide, and initial melting of the filler metal as well as wettings of the oxide by the filler metal.

8 Claims, No Drawings

FLUXLESS BRAZING OF ALUMINUM IN INERT GAS

RELATED CASES

The subject matter of U.S. Pat. No. 4,143,802 is related to the subject matter of this application and is commonly assigned to the assignee herein.

BACKGROUND OF THE INVENTION

The stability of the surface oxide film present on aluminum is a definite impediment to fabricating aluminum parts, such as by brazing. In brazing the film acts as a barrier to wetting and flow of the filler metal required for joint formation. Oxide removal and prevention of reoxidation are the principal requirements for a successful aluminum joining method.

Fluxless brazing has assumed a position of commercial importance because it does not require the removal of a flux residue and reduces the susceptibility to aqueous corrosion of parts having this flux residue. One of the first innovations to promote better fluxless brazing, was the discovery that magnesium, when incorporated as part of the filler metal, promotes the wetting of the oxide by the filler metal. However, the presence of gaseous species of water and oxygen within the brazing chamber react with the promoter element (such as magnesium) to maintain the oxide barrier by inhibiting oxide/filler metal wetting and/or building the oxide thickness to the extent that the barrier envelopes the liquid filler metal and prevents wetting and flow. This is particularly troublesome with inert atmospheres but it also occurs to a lesser degree in vacuum brazing. It has not been fully recognized by the prior art of the disturbance to brazing that results from the presence of even small amounts of gaseous species of $O_2$ and $H_2O$. For example, when a furnace is evacuated to a vacuum level of about $10^{-4}$–$10^{-5}$ Torr and simultaneously heated to a temperature in excess of the melting point of the filler metal containing magnesium, it has been found that trace gaseous species of oxygen and water remain in existence within the vacuum environment. When porosity develops in the oxide film slightly prior to the evolution of magnesium from the solid filler metal, the gaseous species of $O_2$ and $H_2O$ react with the oxide film and form more oxide or a duplex oxide. This subsequently prevents the promoter or magnesium from reacting properly with the original oxide film when porosity develops to a greater extent. As a consequence, the oxide film floats on top of the fluidized filler metal and little or no wetting of the base metal occurs.

Technology to date has not been able to provide a method which would meet these three criteria simultaneously and thereby promote a high quality braze when fabricating the aluminum parts within an inert atmosphere which may contain considerably more gaseous species of oxygen and water than that which would be contained in a vacuum chamber. The requirement of an inert atmosphere is placed upon this invention so that the economy of carrying out such brazing process is increased and thereby the versatility and application of the brazing method can be extended to high volume parts requiring minimum costs.

There are three physical characteristics that must occur simultaneously for optimum results to occur in wetting and formation of a filler at the braze joint free of oxides. These three physical characteristics consist of (a) the transport of magnesium from the filler metal or other source to the oxide film interface in the correct amount and at the precise moment for that which is needed for wetting purposes and not later nor earlier and no more nor less than so needed, (b) the formation of porosity within the oxide film at the right time in the brazing sequence, roughly desirable only after the filler metal melts and the magnesium promoter is available at the oxide interface, and (c) the melting of the filler metal at a sufficiently low enough temperature to correspond with the earliest formation of porosity in the oxide film, and (d) wetting of the oxide by the filler metal.

SUMMARY OF THE INVENTION

A primary object of this invention is to provide an improved method for fluxless brazing of aluminum members in an inert atmosphere containing gaseous species of oxygen and water each in the range of 1–10 ppm.

Another object of this invention is to provide for fluxless brazing of aluminum in an inert atmosphere which controls the initial melting of the filler metal, the initiation of porosity in the oxide film covering the filler metal, and the transport of a gettering and promoter agent (magnesium) to the interface with the oxide film, these physical characteristics occurring simultaneously for optimum attainment of a high quality braze joint.

Features pursuant to the above objects comprise the simultaneous use of three control features: (a) regulating the composition of the filler metal to contain a ternary alloy consisting of aluminum-silicon-magnesium and the base metal to contain a binary alloy of aluminum-magnesium (the magnesium, in both the filler and base metal, is contained in precisely controlled amounts to facilitate continuous transport of the magnesium in a liquid or solid state to the oxide interface at the proper time during heat-up in the brazing furnace and in a controlled quantity), (b) control of the silicon content within the filler metal to the range of 7.5–12% for purposes of facilitating a lower melting level, and (c) rapid and/or pulsed heating through a temperature range beginning at 400° C. to the temperature at which the filler metal is fluid enough for joint formation, the heating rate in such temperature zone being in excess of 50° 1 C./minute. The latter limits the time of reaction of residual gaseous contaminates with metal and is a critical factor in preventing even very small amounts of contaminates from interfering.

DETAILED DESCRIPTION

The surface film of an aluminum part or an aluminum alloy is in many respects the key to the properties and potential utility of this material. The film is a refractory oxide ordinarily thin, self-healing, and covers the surface of the part to provide inertness of this otherwise highly reactive metal. In brazing, the oxide film acts as a barrier to the wetting flow required to joint formation.

In both vacuum and inert atmosphere brazing, the mechanism for removal of the oxide barrier has not been completely understood. However, it is now recognized in accordance with this invention, that promoter agents, those which are capable of reducing the aluminum film, and which are also capable of acting as a gettering agent for oxygen and water in the brazing chamber, must be used. What is not recognized by the prior art is how to utilize such promoter and gettering agents so that they can operate effectively within an inert gas chamber containing considerable gaseous species of $O_2$ and $H_2O$. An inert gas atmosphere for purposes of this invention is defined as one which contains a dew point below $-40°$ C. or alternatively one in which the gaseous species of each of oxygen and water is between 1-10 ppm.

A preferred method for brazing aluminum members within an inert gas atmosphere as above described, is as follows:

1. An aluminum based structure is prepared by forming sheets of clad alloys. The clad sheets are formed and assembled into the usual configuration for an aluminum apparatus, such as an aluminum radiator. The assembly is fixtured to maintain proper joint fit-up during the braze process. The content of the core of the aluminum members to be brazed is regulated to consist of a binary alloy of aluminum and magnesium, the magnesium being limited to the concentration range of 0.4-1.2% by weight of the core. The composition of the clad material is restricted to contain a ternary alloy consisting of silicon in the range of 7.5-12%, magnesium in the range of 0.2-6% (in some instances 0.1-0.15% bismuth) and the remainder aluminum.

2. The filler metal is located at the desired joining sites as a result of the cladding of the sheets which brings the filler metal into play no matter where the joint is disposed. In instances where clad sheet is not employed, filler metal must be carefully deposited at the desired sites.

3. The structurally assembled parent members are then placed in a furnace for heating while exposed to an inert gas atmosphere at ambient pressure conditions; the heating rate must be critically controlled as the assembly is heated through the temperature zone of 400°-550° 1 C. The heating rate in this critical zone must proceed at a rate of at least 50° C. per minute.

4. When the assembly reaches 550° 1 C., heating is further carried out at a slower rate and the assembly is raised to a brazing temperature conforming with the knowledge of the prior art.

Several phenomena are caused to occur simultaneously as a result of following the above steps. A larger percentage of the filler metal is caused to melt at a lower temperature than that normally experienced by the prior art because of the incorporation of silicon in a controlled amount of 7.5-12%, the ternary alloy melting preferably in the range of 1024°-1056° F. Secondly, the initiation of porosity in the oxide film, covering the clad material or other exposed parts of the aluminum members, is caused to occur at a time much closer to the moment at which the filler metal becomes liquid. This is brought about by the heating rate which is sufficiently rapid to inhibit porosity formation. In this manner, the gaseous species in the inert gas atmosphere are unable to react with the magnesium promoter until the initiation of porosity in the oxide film. Thirdly, it is important that the supply of magnesium transported to the oxide film interface be considerably limited because of the extreme tendency of magnesium to combine with the increased volume of gaseous species of oxygen and water in the brazing atmosphere. Accordingly, the only moment at which magnesium is required at the oxide film is at the moment the oxide film becomes porous concurring with the liquidification of the filler metal. This controlled transport of magnesium to such oxide film interface is brought about by limiting the content of magnesium in the filler metal to 0.2-0.6. Such magnesium moves relatively rapidly to a vapor phase only in vacuum; in an inert gas atmosphere, the magnesium phase change is slowed and reduced loss of magnesium occurs. This is principally due to the greater density of an inert atmosphere compared to a vacuum (7 orders of magnitude greater); the magnesium that does form as a vapor is reflected back by the external inert gas phase retarding generation of additional magnesium vapor.

Since the magnesium is limited in quantity in the filler metal its migration out of the filler metal is thereby optimally delayed. Additional magnesium is required above and beyond the 0.2-0.6% content of the filler metal; this is replenished by drawing additional, but very small and limited quantities, of magnesium contained in the core. It is theorized that by providing transport (in either the solid or liquid form) of magnesium from the core to the filler metal and eventually to the oxide film, the concentration of magnesium in the filler metal is maintained at the filler metal-oxide interface. Thus, a continuous replenishment of magnesium is provided and a continuous process by which good fillet formation is assured. At the same time, the tendency for magnesium exposure to oxidation is limited and thus braze degradation is reduced.

Accordingly, the oxide film will develop porosity initially at about 480° C.: as heating proceeds above this temperature, $Mg_2Si$ will dissociate allowing magnesium to collect and react with the porous oxide. As the temperature is raised further to 550° C., a wicking action or capillary movement of the partially molten filler metal will take place through such porosity even though the filler metal is in a mushy condition and too viscous to flow appreciably at this stage. After the temperature level of 550° C. is reached, the filler metal becomes more fluid and the flow required in joint filling can be accommodated under regular processes.

What is claimed is:

1. A method of brazing of aluminum parts in a gas atmosphere containing gaseous species of $O_2$ in a concentration below 10 ppm and $H_2O$ in a concentration below 10 ppm, the method comprising:
    (a) preparing and structurally relating together aluminum or aluminum alloy parts to form an assembly having joining sites,
    (b) depositing a filler metal alloy at the joining sites of said assembly, said filler metal alloy consisting essentially of 7.5-12% silicon, 0.2-0.6% magnesium and the remainder essentially aluminum and normal residuals,
    (c) subjecting said assembly and deposited filler metal to heat to effect brazing while exposed to said gas atmosphere, said atmosphere being at or about an ambient pressure condition, said heat being applied at a rate to minimize formation of a magnesium oxide film at the joining sites.

2. A method of brazing as in claim 1, in which the filler metal alloy additionally contains 0.1-0.15% bismuth.

3. A method of brazing as in claim 1, in which said parts comprise core cladded sheets, the core consisting of a binary alloy of aluminum-magnesium, the magnesium content in the core being limited to 0.4-1.2%, the clad consisting of a ternary alloy of aluminum-silicon-magnesium, with the magnesium being limited to 0.2-6% and silicon limited to 7-12%.

4. The method as in claim 1, in which said parts are comprised of an aluminum alloy selected from the group consisting of 6951, 5005 and 3004.

5. A method of brazing an assembly of aluminum or aluminum alloy parts requiring numerous joining sites, said brazing being carried out in a gas atmosphere containing gaseous species of $O_2$ and $H_2O$, each in a concentration between 1–10 ppm, comprising:
(a) depositing a filler metal alloy at the joining sites of said assembly, the latter consisting of Al-Si-Mg, said filler metal alloy having from 0.2 to 0.6% magnesium to (i) shorten the heating time to prevent runoff of liquid filler metal and (ii) to prevent generation of excess magnesium vapor that forms MgO,
(b) heating said assembly and filler metal alloy in said gas atmosphere, said heating being continued to effect brazing without runoff of liquid filler metal and without generation of excess magnesium vapor.

6. A method of brazing as in claim 1, in which the heating rate is sufficient to provide a time period during which the said assembly is in a temperature zone of 400°–500° C. which is less than 2 minutes.

7. A method of brazing as in claim 1 in which said aluminum alloy parts are comprised of an aluminum alloy containing 0.4–1.2% Mg.

8. A method as in claim 1 in which said heating rate is arranged so that when the assembly experiences a temperature in the range of 400°–550° C., the heating rate is at least 50° C./minute.

* * * * *